United States Patent
Logan et al.

(10) Patent No.: US 8,986,113 B2
(45) Date of Patent: Mar. 24, 2015

(54) AMUSEMENT DEVICE HAVING TIME-BASED OPERATING MODES

(75) Inventors: David S. Logan, Washington Crossing, PA (US); James R. Stelzer, Bensalem, PA (US); Robert K. Mills, Huntingdon Valley, PA (US); Thomas J. Kane, Bensalem, PA (US)

(73) Assignee: AMI Entertainment Network, LLC, Trevose, PA (US)

( * ) Notice: Subject to any disclaimer, the term of this patent is extended or adjusted under 35 U.S.C. 154(b) by 1475 days.

(21) Appl. No.: 12/685,436

(22) Filed: Jan. 11, 2010

(65) Prior Publication Data

US 2010/0113141 A1    May 6, 2010

Related U.S. Application Data

(63) Continuation of application No. 10/937,681, filed on Sep. 9, 2004, now abandoned.

(60) Provisional application No. 60/503,245, filed on Sep. 16, 2003.

(51) Int. Cl.
*A63F 9/24* (2006.01)
*G06F 17/00* (2006.01)
*G07F 17/32* (2006.01)

(52) U.S. Cl.
CPC ............. *G07F 17/3269* (2013.01); *G07F 17/32* (2013.01); *G07F 17/3209* (2013.01); *G07F 17/3218* (2013.01); *G07F 17/3262* (2013.01)
USPC ......................................................... 463/29

(58) Field of Classification Search
None
See application file for complete search history.

(56) References Cited

U.S. PATENT DOCUMENTS

| 4,353,554 A | 10/1982 | Fisher |
| 4,524,968 A | 6/1985 | Dolp |
| 4,527,578 A | 7/1985 | Klein et al. |
| 4,652,998 A * | 3/1987 | Koza et al. ...................... 463/26 |
| 4,856,787 A | 8/1989 | Itkis |

(Continued)

FOREIGN PATENT DOCUMENTS

GB     2170937 A     8/1986

OTHER PUBLICATIONS

Merit Industries Inc. Megatouch® Elite Edge, printout from website: www.meritind.com/Megatouch%20EliteEdge/Megatouch Elite Edge.asp—printout dated Jan. 19, 2005 original posting dated unknown, 1 page.

(Continued)

*Primary Examiner* — Paul A D'Agostino
(74) *Attorney, Agent, or Firm* — Panitch Schwarze Belisario & Nadel LLP

(57) ABSTRACT

An amusement device has a display and an input device and includes a memory and a controller. The memory stores a plurality of games and a system control program. The controller is operatively coupled to the memory, the input device and the display. The controller controls the display based upon the system control program retrieved from the memory and based upon inputs from the input device. The controller is configured to grant a user a block of time for accessing the amusement device; permit the user to selectively retrieve from the memory and play a first game from the plurality of games during the block of time; and permit the user to selectively retrieve from the memory and play a second game from the plurality of games that is different than the first game during the block of time.

17 Claims, 19 Drawing Sheets

(56) References Cited

U.S. PATENT DOCUMENTS

| | | | |
|---|---|---|---|
| 5,078,399 A | 1/1992 | Lennon, Jr. | |
| 5,377,973 A | 1/1995 | Jones et al. | |
| 5,575,717 A | 11/1996 | Houriet, Jr. et al. | |
| 5,679,077 A * | 10/1997 | Pocock et al. | 463/19 |
| 5,743,799 A | 4/1998 | Houriet, Jr. et al. | |
| 5,970,143 A * | 10/1999 | Schneier et al. | 713/181 |
| 6,029,046 A | 2/2000 | Khan et al. | |
| 6,082,887 A | 7/2000 | Feuer et al. | |
| 6,196,920 B1 | 3/2001 | Spaur et al. | |
| 6,293,866 B1 | 9/2001 | Walker et al. | |
| 6,558,259 B1 | 5/2003 | Maruyama et al. | |
| 6,929,549 B1 * | 8/2005 | Yamada | 463/42 |
| 7,169,043 B2 | 1/2007 | Seelig et al. | |
| 8,403,745 B2 * | 3/2013 | Boyd et al. | 463/25 |
| 2001/0024969 A1 | 9/2001 | Jones et al. | |
| 2001/0044339 A1 | 11/2001 | Cordero et al. | |
| 2002/0023010 A1 | 2/2002 | Rittmaster et al. | |
| 2002/0054016 A1 | 5/2002 | Smith et al. | |
| 2002/0077168 A1 | 6/2002 | Jones et al. | |
| 2002/0132660 A1 | 9/2002 | Taylor | |
| 2002/0154749 A1 | 10/2002 | Conn et al. | |
| 2003/0022719 A1 | 1/2003 | Donald et al. | |
| 2003/0045349 A1 | 3/2003 | Hughs-Baird | |
| 2003/0109307 A1 * | 6/2003 | Boyd | 463/41 |
| 2003/0130029 A1 | 7/2003 | Crumby | |
| 2003/0177347 A1 * | 9/2003 | Schneier et al. | 713/151 |
| 2003/0181234 A1 * | 9/2003 | Falciglia, Sr. | 463/16 |
| 2003/0195028 A1 | 10/2003 | Glavich | |
| 2004/0018871 A1 | 1/2004 | Seelig et al. | |
| 2004/0048657 A1 * | 3/2004 | Gauselmann | 463/25 |
| 2004/0098310 A1 * | 5/2004 | Engelhart | 705/26 |
| 2004/0102238 A1 * | 5/2004 | Taylor | 463/16 |
| 2004/0125077 A1 * | 7/2004 | Ashton | 345/156 |
| 2005/0049037 A1 * | 3/2005 | Anderson et al. | 463/25 |
| 2005/0076376 A1 * | 4/2005 | Lind | 725/87 |
| 2005/0080678 A1 | 4/2005 | Economy et al. | |
| 2005/0181870 A1 | 8/2005 | Nguyen et al. | |
| 2005/0203998 A1 | 9/2005 | Kinnunen et al. | |
| 2006/0093142 A1 | 5/2006 | Schneier et al. | |
| 2006/0205511 A1 | 9/2006 | Thomas et al. | |
| 2007/0167229 A1 | 7/2007 | LeMay et al. | |
| 2007/0202951 A1 * | 8/2007 | Bogosian et al. | 463/42 |

OTHER PUBLICATIONS

Merit Industries Inc. Megatouch® e.v.o. Wallette, printout from website: www.meritind.com/Megatouch%20evo%2020Wallette/Megatouch evo wallette.asp printout dated Jan. 19, 2005 original posting dated unknown, 1 page.

Merit Industries Inc. Megatouch® e.v.o., printout from website: www.meritind.com/EVO/eVo.asp printout dated Jan. 19, 2005 original posting dated unknown, 1 page.

Merit Industries Inc. Megatouch® Fusion, printout from website: www.meritind.com/Fusion/Fusion.asp printout dated Jan. 19, 2005 original posting dated unknown, 1 page.

Merit Industries Inc. System Megatouch, printout from website: www.meritind.com/SystemMegatouch/SysMega1.asp printout dated Jan. 19, 2005 original posting dated unknown, 1 page.

Office Action Issued Jul. 13, 2007 in U.S. Appl. No. 10/937,681.
Office Action Issued Jan. 31, 2008 in U.S. Appl. No. 10/937,681.
Office Action Issued Jul. 11, 2008 in U.S. Appl. No. 10/937,681.
Office Action Issued Jan. 22, 2009 in U.S. Appl. No. 10/937,681.
Office Action Issued Sep. 10, 2009 in U.S. Appl. No. 10/937,681.

* cited by examiner

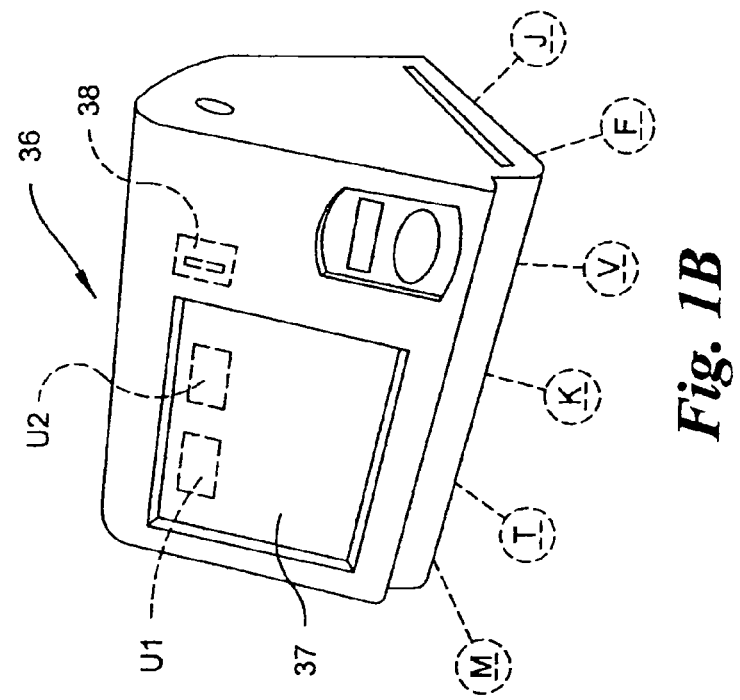
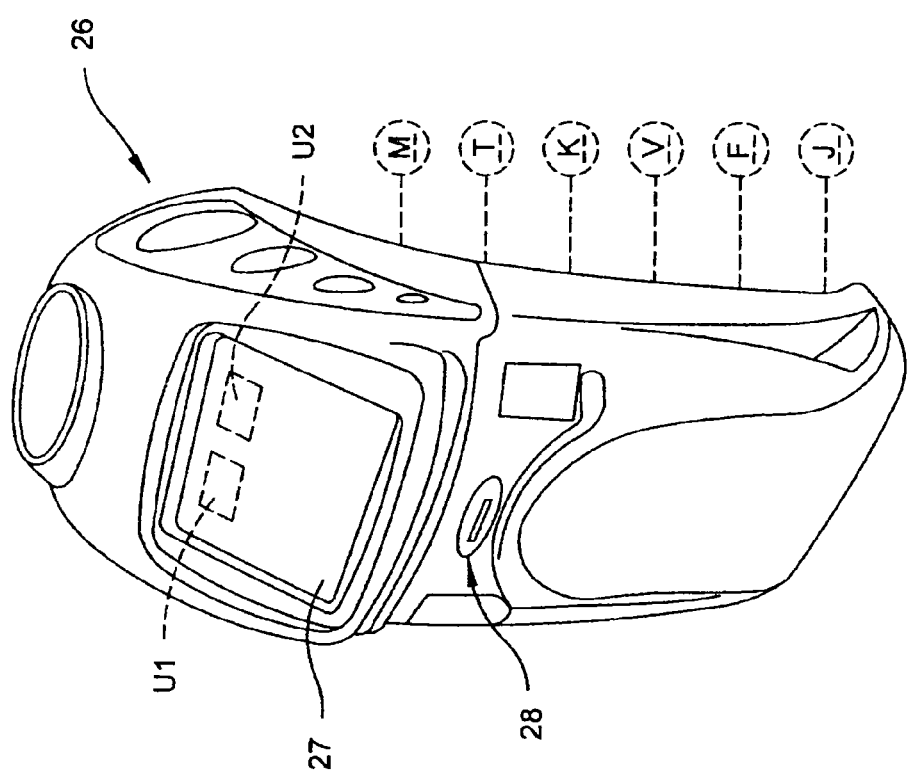
Fig. 1B
Fig. 1A

AMUSEMENT DEVICE HAVING TIME-BASED OPERATING MODES

CROSS-REFERENCE TO RELATED APPLICATIONS

This application is a continuation application of U.S. patent application Ser. No. 10/937,681, filed on Sep. 9, 2004, currently pending, entitled "Amusement Device Having Time-Based Operating Modes," which claims the benefit of U.S. Provisional Patent Application No. 60/503,245, filed Sep. 16, 2003, the entire contents of all of which are incorporated by reference herein.

BACKGROUND OF THE INVENTION

The present invention relates generally to an amusement device and, more particularly, relates to an amusement device having time-based operating modes.

Amusement devices, such as game machines, which allow a user to select games from a video display are well known in the art such as those disclosed in U.S. Pat. No. 4,856,787 (Itkis); U.S. Pat. No. 5,575,717 (Houriet, Jr. et al.); U.S. Pat. No. 5,743,799 (Houriet, Jr. et al.), the contents of which are incorporated by reference herein, each of which shows a touchscreen display for making a game selection from a menu of games. Such game machines or amusement devices typically operate upon input of currency (i.e., coin, token, paper money, credit/debit cards and the like) and are installed in bars, restaurants, airports, shopping malls, video arcades and the like. The game choices may include card games, sports games, games of skill, games of chance, action games, trivia games and the like.

Amusement devices which operate upon input of currency (either coin, token or paper money) typically track machine usage in a meter. Typically, each currency input creates a pulse which sequentially advances the meter or each currency input grants a predetermined number of game play credits and the meter is advanced by the granted number of play credits.

Some amusement devices are capable of being set to provide bonus credits for additional currency inputs. For example, a gaming machine may be set to grant one game per quarter, but will grant five games per dollar (a bonus credit of one game). A user may deposit a dollar bill, for example, and receive five credits, but each selected game may only require one credit to play. Thus, the user is left with a balance of four unused credits after selecting a single game to play. Also, some games are configured to award bonus credits for winning the high score during a game or for some other predetermined event. In that case a user may be left with a balance of credits that exceeds the original number of credits paid for by the user.

Some regulatory agencies, state or local, have "gaming" regulations which do not permit games to have a remaining balance of credit in excess of some regulated predetermined value, such as one credit. The intent of such regulations is to minimize possible illicit uses of amusement devices such as for illegal gambling and the like. However, as a result of such regulations, an owner or operator of an amusement device may lose revenue because users may need to be refunded change for the credits immediately or higher prices may be charged for a game. For example, instead of charging twenty five cents per game (one credit), the owner/operator may charge fifty cents or a dollar per game so that there would be no refunds required and one or less credits remaining at the end of a user's game.

It is desirable to provide an amusement device configured to operate in a time based mode. Further, it is desirable to provide an amusement device configured to operate in a time based mode where a block of time may be purchased in advance so that a user may switch between different games and activities during the block of time. Even further, it is desirable to provide an amusement device configured to operate in a time based mode where a user may switch between different games and activities for as long as they desire or until a predetermined period of time has elapsed thereby causing the user to be billed for the time retroactively.

BRIEF SUMMARY OF THE INVENTION

Briefly stated, the present invention comprises an amusement device that has a display and an input device and that includes a memory and a controller. The memory stores a plurality of games and a system control program. The controller is operatively coupled to the memory, the input device and the display. The controller controls the display based upon the system control program retrieved from the memory and based upon inputs from the input device. The controller is configured to grant a user a block of time for accessing the amusement device; permit the user to selectively retrieve from the memory and play a first game from the plurality of games during the block of time; and permit the user to selectively retrieve from the memory and play a second game from the plurality of games that is different than the first game during the block of time.

The present invention also comprises a method of playing an amusement device having a display, an input device, a memory that stores a plurality of games and a system control program, and a controller operatively coupled to the memory, the input device and the display. The controller controls the display based upon the system control program retrieved from the memory and based upon inputs from the input device. The method includes granting a user a block of time for accessing the amusement device; selecting and playing a first game from the plurality of games during the block of time; and selecting and playing a second game from the plurality of games that is different than the first game during the block of time.

The present invention also comprises an amusement device having a display and an input device. The amusement device includes a memory that stores a plurality of games and a system control program and a controller operatively coupled to the memory, the input device and the display. The controller controls the display based upon the system control program retrieved from the memory and based upon inputs from the input device. The controller is configured to grant a user a block of time for accessing the amusement device; permit the user to selectively retrieve from the memory and play a first game from the plurality of games during the block of time; and allow the user to continue to play the first game continuously until the block of time expires.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1A is a perspective view of an amusement device having time based operating modes in accordance with the preferred embodiments of the present invention;

FIG. 1B is a perspective view of another amusement device having time based operating modes in accordance with the preferred embodiments of the present invention;

DETAILED DESCRIPTION OF THE INVENTION

Figure 2:
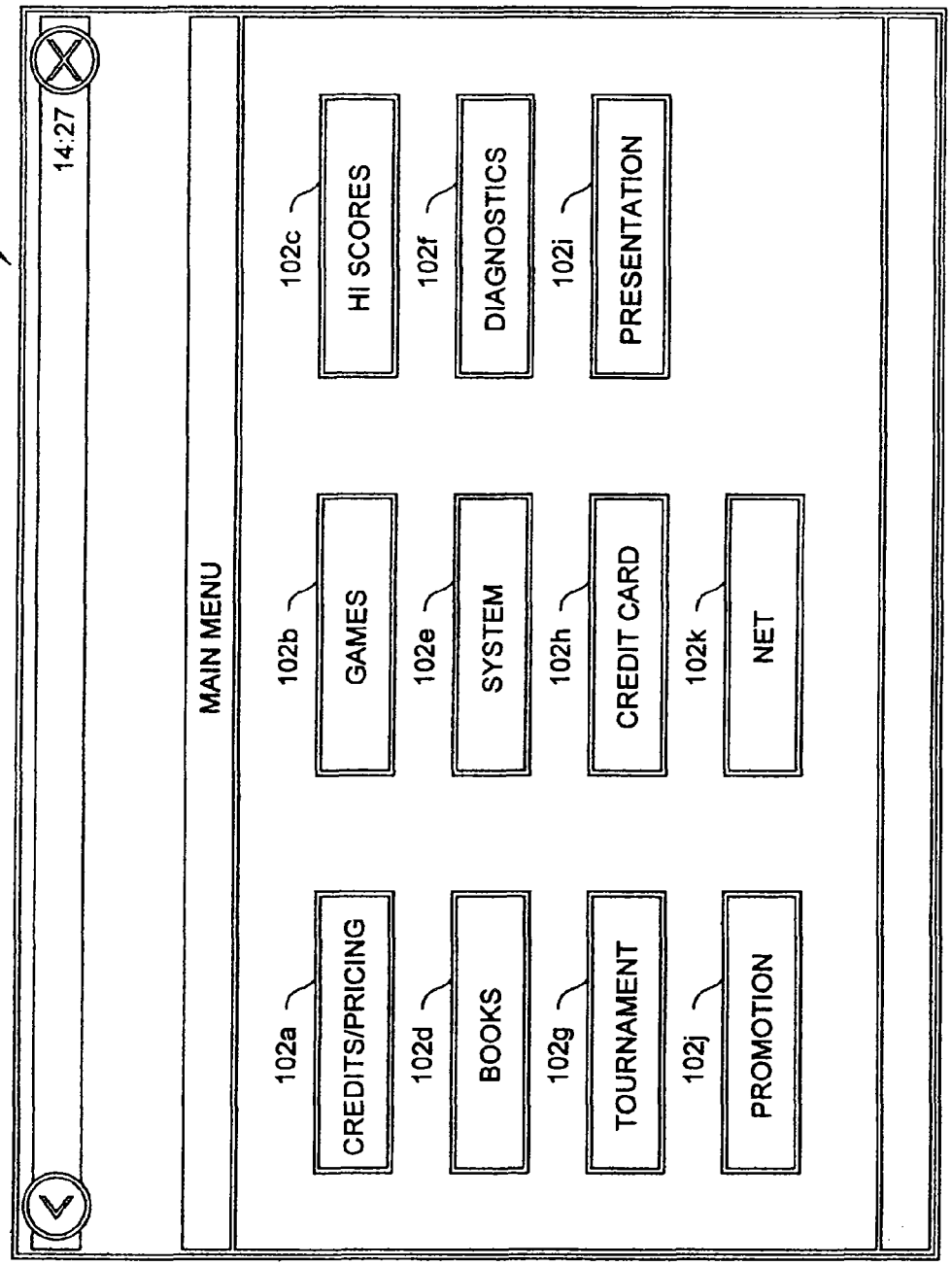
FIG. 2 is a screen shot of a main menu setup screen in accordance with the preferred embodiments of the present invention.

In the drawings, like numerals are used to indicate like elements throughout. Referring to the drawings in detail, FIG. 1A shows a first amusement device 26 having time based operating modes in accordance with the preferred embodiments of the present invention. The amusement device 26 includes a controller U1 and a memory U2. The amusement device 26 further includes a video display 27 which is operatively connected to the amusement device controller U1. FIG. 1B shows another or second amusement device 36 having time based operating modes in accordance with the preferred embodiments of the present invention. The second amusement device 36 also includes a controller U1 and a memory U2. The second amusement device 14 also includes a video display 17. Preferably, the video displays 27, 37 are a touchscreen video displays configured to accept touch input. The first amusement device 26 is a free-standing or floor-standing apparatus, whereas the second amusement device 36 is a table-top or counter-top apparatus. However, the amusement devices 26, 36 may be arranged in any configuration including table mount, wall mount, pole mount and the like without departing from the invention.

The amusement device 26, 36 may optionally include, or be connected to, a currency accepter 28, 38 such as a coin acceptor, a bill acceptor, a card reader and the like, for accepting monetary or other types of credit.

FIGS. 1A-1B show that other input devices which may be connected to the amusement devices 26, 36 include a trackball or touchpad T, a mouse M, a joy-stick J, a foot-pedal F, a voice recognition system V, a keypad K or keyboard K and the like. Preferably, the input device is the touchscreen display 37.

Each amusement device 26, 36 is a stand-alone computer system controlled by the controller or microprocessor U1, the memory U2, a communications driver (not labeled) and a touchscreen video display driver (not labeled). For purposes of simplicity, the invention will be described with respect to the amusement device 36 throughout the remainder of the description, but it should be noted that the present invention could be implemented with any variety of amusement devices 26, 36 without departing from the spirit of the invention.

The memory U2 stores a plurality of games and a system control program. The controller U1 is operatively coupled to the memory U2, the input device and the display 37 (i.e., the touchscreen display 37). The controller U1 controls the touchscreen display 37 based upon the system control program retrieved from the memory U2 and based upon inputs from the input device in this case the touchscreen display 37. As used herein, the system control program refers to all of the software functions outside of the game or music files including an operating system, display control, input control, sound drivers and the like. The controller U1 is configured to grant a user a block of time for accessing the amusement device 36; permit the user to selectively retrieve from the memory U2 and play a first game from the plurality of games during the block of time; and permit the user to selectively retrieve from the memory U2 and play a second game from the plurality of games that is different than the first game during the block of time. The user may repeat this process of selecting another game as many times as they desire as long as there is time remaining in the block of time.

The amusement device 36 includes an operating mode (FIGS. 11-19) and a setup mode (FIGS. 2-10). When the operating mode is selected, a player or user is selectively permitted to play games. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 36.

Figure 13:
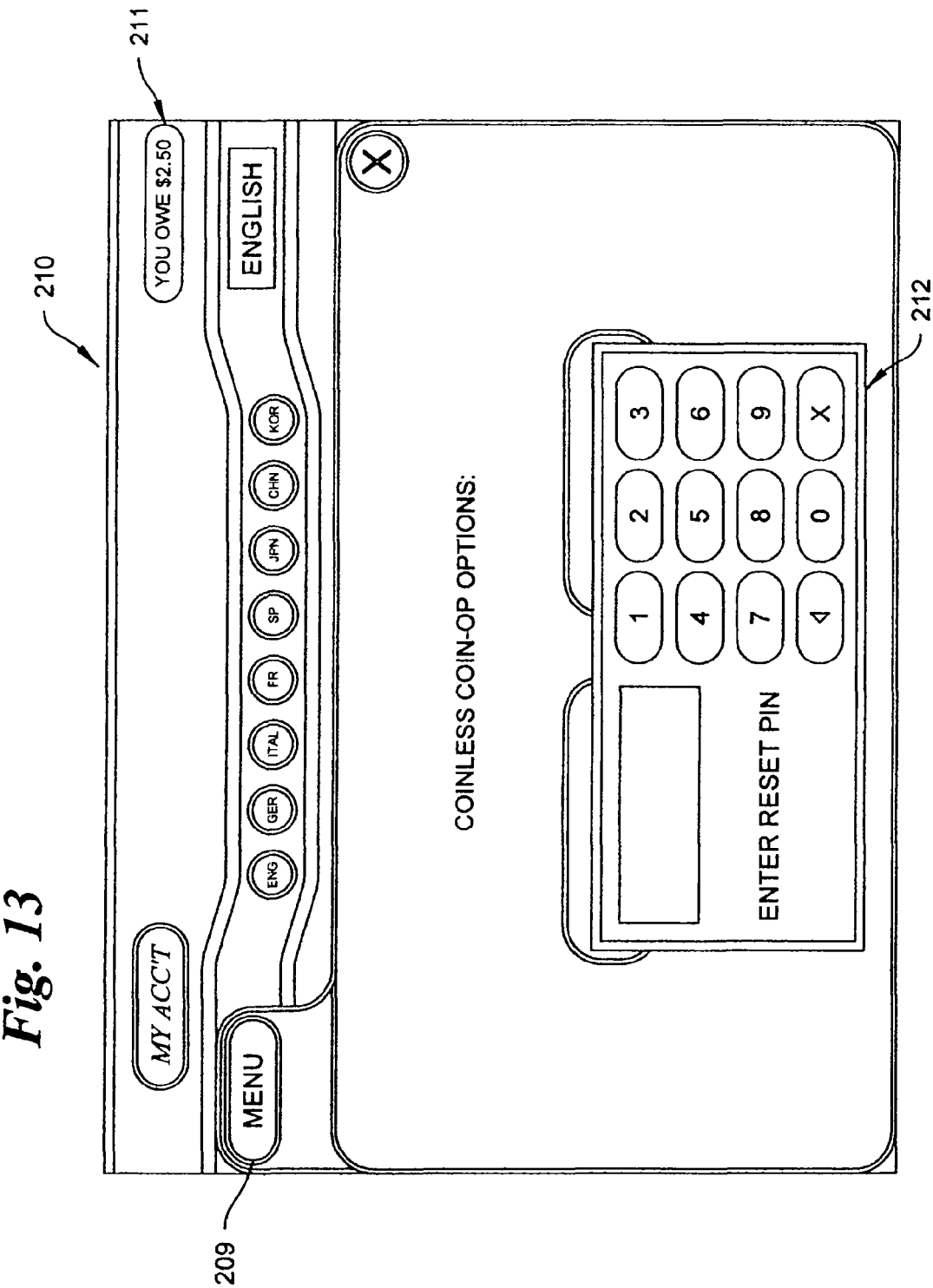
FIG. 13 is a screen shot of an attendant reset pin entry screen in accordance with the first preferred embodiment of the present invention.

In a first preferred embodiment, the controller U1 grants the user the block of time in advance of a payment or a credit by the user. The controller U1 must receive an authorization prior to granting the block of time. For example, the authorization may be one of a pin code entry, card code data, a network signal and a remote control signal. Preferably, the authorization is by way of a pin code or password entered in a software keypad 212 (FIG. 13). For example, a user may be charged a flat rate of say $2.50 to play as many games as they like for say fifteen minutes of play time. The rate for the block of time and the amount or duration of the block of time are preferably adjustable by the owner/operator of the amusement device 36.

In a second preferred embodiment, the controller U1 grants the user the block of time only after a payment or a credit by the user. So, a user deposits money or credits in a known way such as by depositing money in the currency acceptor 38, and then the user is granted an associated amount or block of time to play games. For example, a user may put in $0.25 and get two minutes of play time, or the user may deposit $0.50 and get five minutes of play time or the user may deposit $1.00 and get twelve minutes of play time. The ratios of the durations of the blocks of time and the monetary values associated therewith are preferably adjustable by the owner or operator of the amusement device 36.

In any of the preferred time-based embodiments, a user is permitted to play as many games as they desire during a block of time. The user need not play a game through until it ends. If the user gets bored with a particular game or desires to play a different game, the user may exit the game and choose another game so long as there is time remaining in the block of time. Optionally, when the block of time expires, the user may keep playing the game they were playing at the expiration of the block of time until the game is over based on the rules of the game. Optionally, the amusement device may prompt the user to purchase another time block just before the current time block expires.

The owner/operator of the amusement device 36, selects the setup mode by using the mode selector pushbutton, as mentioned above. Once in the setup mode, the owner/operator can configure the amusement device using setup screens (FIGS. 2-10) as will be described hereinafter.

FIG. 2 is a screen shot of a main menu setup screen 100 in accordance with all the preferred embodiments of the present invention. The main menu setup screen 100 includes a plurality of menu buttons 102a-102k for selecting other setup screens such as a credits menu screen 110 (FIG. 3) thereby permitting the owner/operator to navigate among the setup screens 110, 120, 130, 140, etc. The menu buttons 102a-102k include a credits/pricing menu button 102a, a games menu button 102b, a hi scores menu button 102c, a books menu button 102d, a system menu button 102e, a diagnostics menu button 102f, a Tournament menu button 102g, a credit card menu button 102h, a presentation menu button 102i, a promotion menu button 102j and a Net menu button 102k. By selecting, for example, the credits/pricing menu button 102a, a credits menu screen 110 (FIG. 3) is displayed. The main menu setup screen 100 also includes some common navigation buttons, i.e., common to all of the setup screens, such as a back button "<" which goes back to the previous or last screen and an exit button "X" for exiting back to the operating mode.

Figure 3:
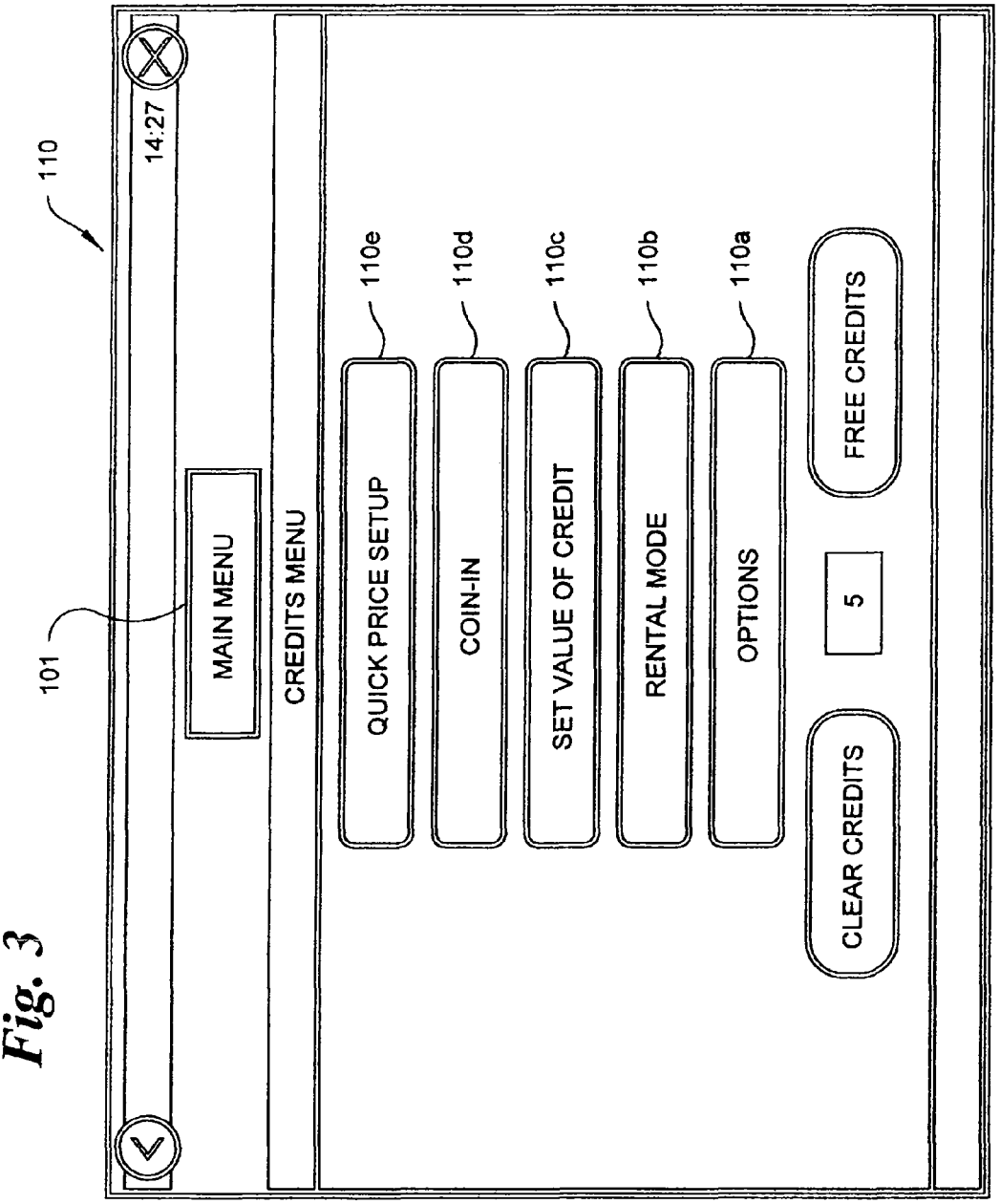
FIG. 3 is a screen shot of a credits menu setup screen in accordance with the preferred embodiments of the present invention.

FIG. 3 is a screen shot of the credits menu setup screen 110 in accordance with all of the preferred embodiments of the present invention. The credits menu setup screen 110 includes a main menu button 101 for going back to the main menu setup screen 100. The credits menu setup screen 110 includes a plurality of other menu buttons 110a-110e for selecting other credits menu screens 120, 130, 140 and the like. The menu buttons 110a-110e include an options menu button 110a, a rental mode button 110b, a set value of credit menu button 110c, a coin-in menu button 110d and a quick price setup 110e. By selecting the options menu button 110a, an options menu screen 120 (FIGS. 4-6) is displayed. By selecting the rental mode menu button 110b, a rental mode menu screen 150 (FIG. 9) is displayed. By selecting the set value of credit menu button 110c, a set value of credit menu setup screen 160 (FIG. 10) is displayed. By selecting a coinless coin-op menu button (not shown), a coinless coin-op setup screen 180 (FIG. 10) is displayed.

Figure 4:
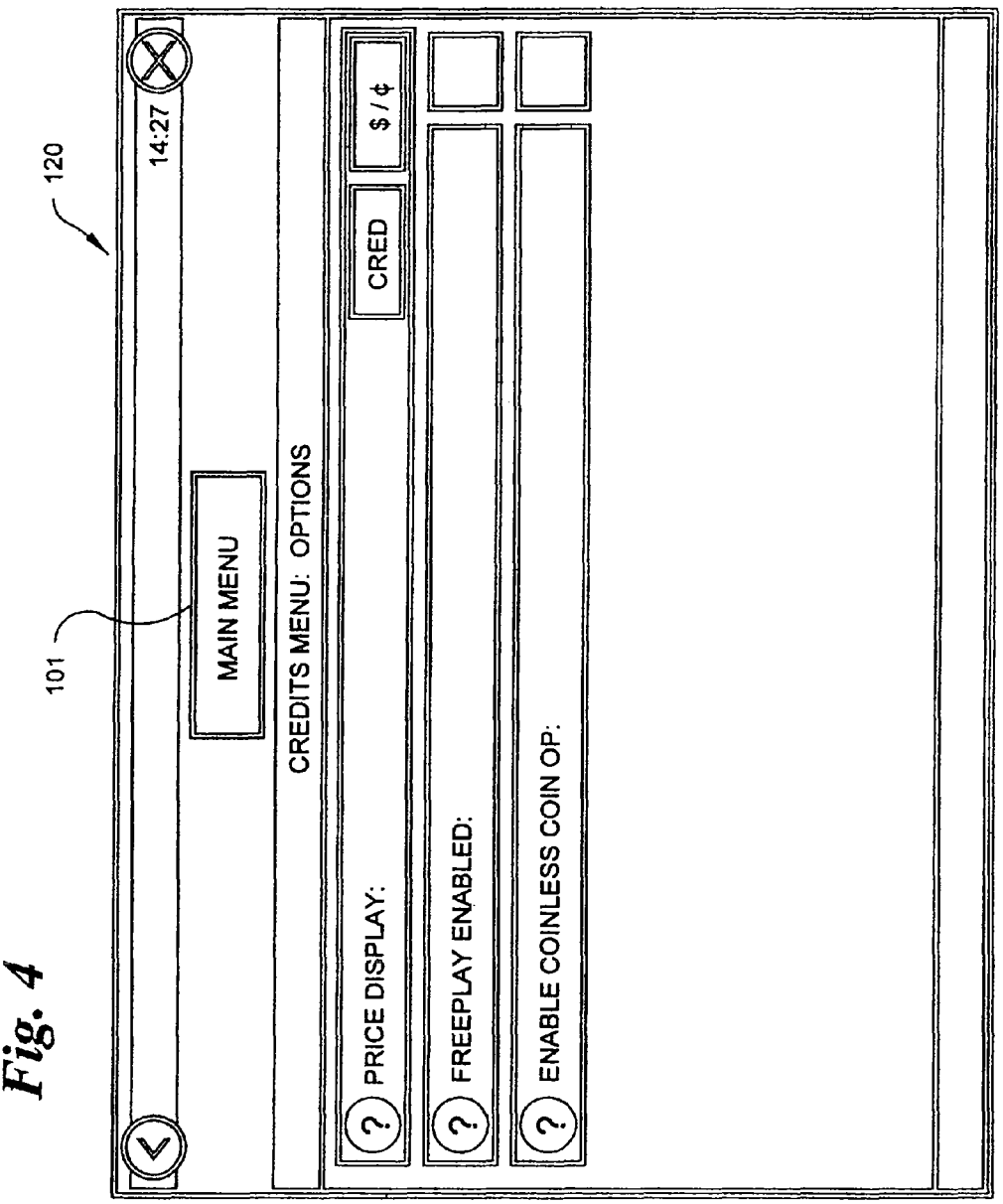
FIG. 4 is a screen shot of an options menu setup screen in accordance with the preferred embodiments of the present invention.
Figure 5:
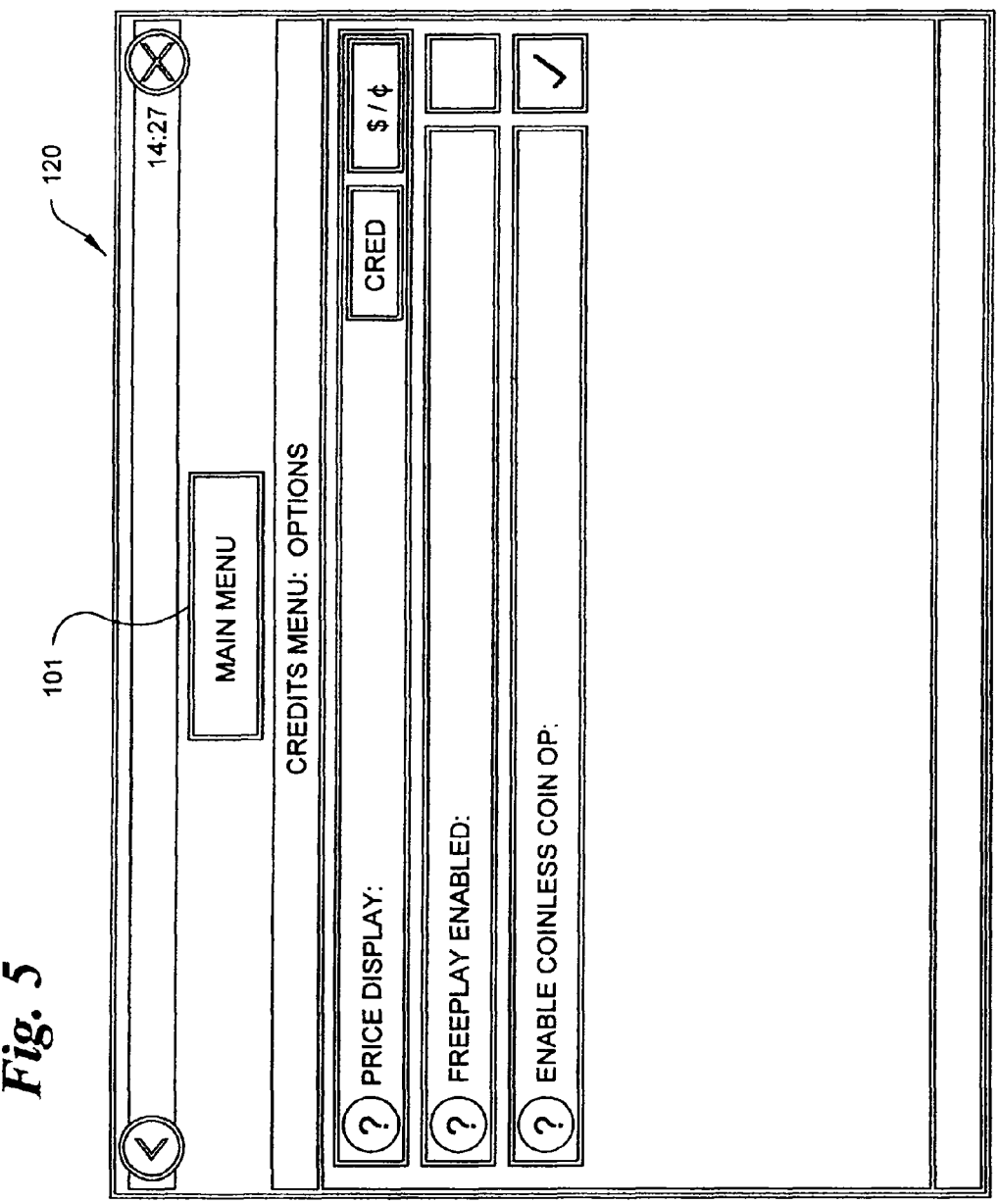
FIG. 5 is a screen shot of the options menu setup screen of FIG. 4 with a coinless mode feature enabled.

FIG. 4 is a screen shot of the options menu setup screen 120 arranged in accordance with the preferred embodiments of the present invention. FIG. 5 is a screen shot of the options menu setup screen of FIG. 4 with a coinless mode feature enabled. With the coinless mode feature enabled, the amusement device 36 can be operated without a currency acceptor 38. In the coinless mode, the user is prompted to accept billing via menu prompts and is billed separately, e.g., as an added line item on an overall food and/or beverage check and the like.

Figure 6:
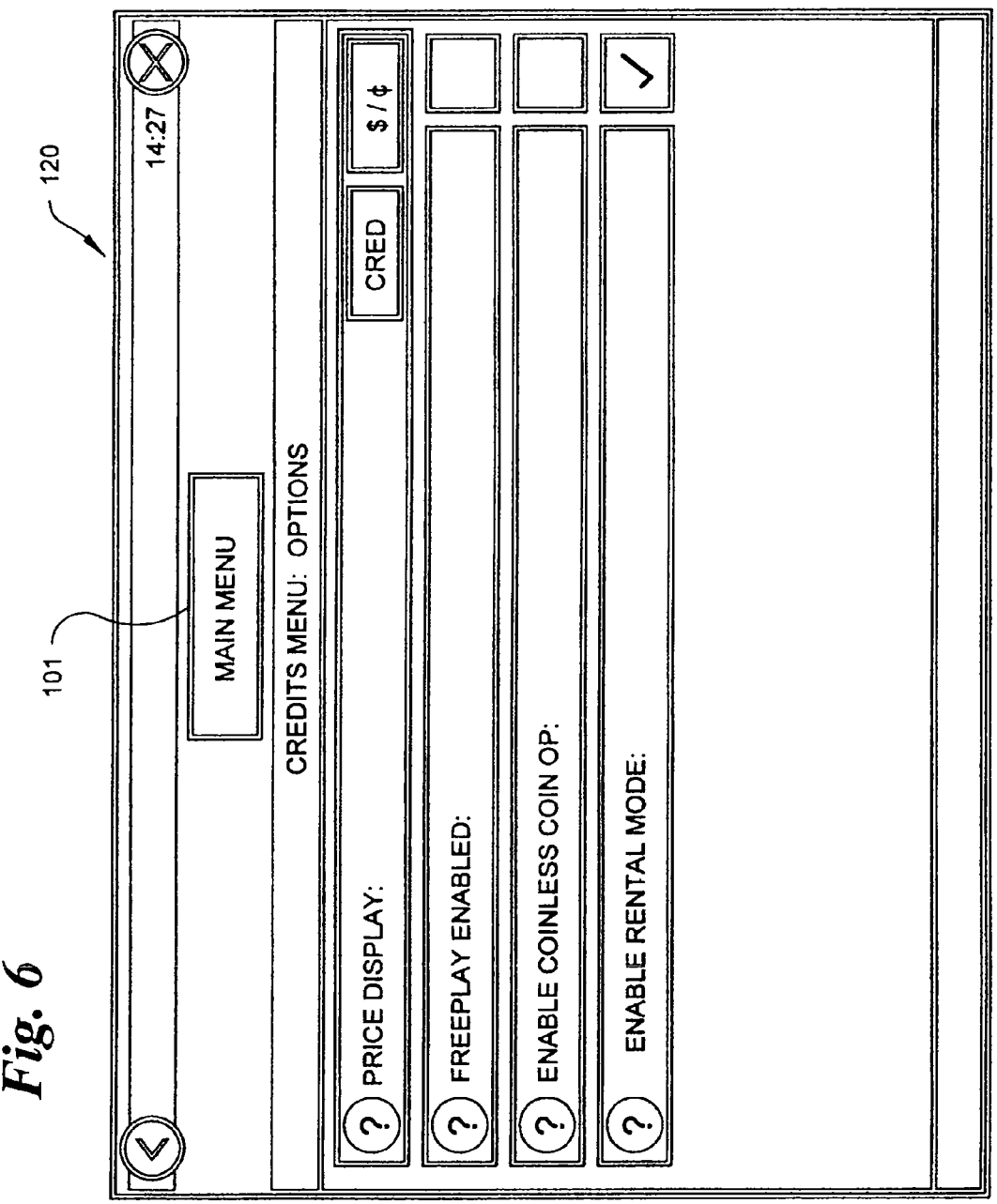
FIG. 6 is a screen shot of an options menu setup screen in accordance with a second preferred embodiment of the present invention with a rental mode enabled.

FIG. 6 is a screen shot of the options menu setup screen 120 arranged in accordance with the second preferred embodiment of the present invention with the rental mode enabled, i.e., where the block of time is granted after a payment or credit by the user. In the rental mode, the user deposits money or applies credit or credits in advance to pre-purchase or "rent"/"lease" time for using the amusement device 36.

Figure 7:
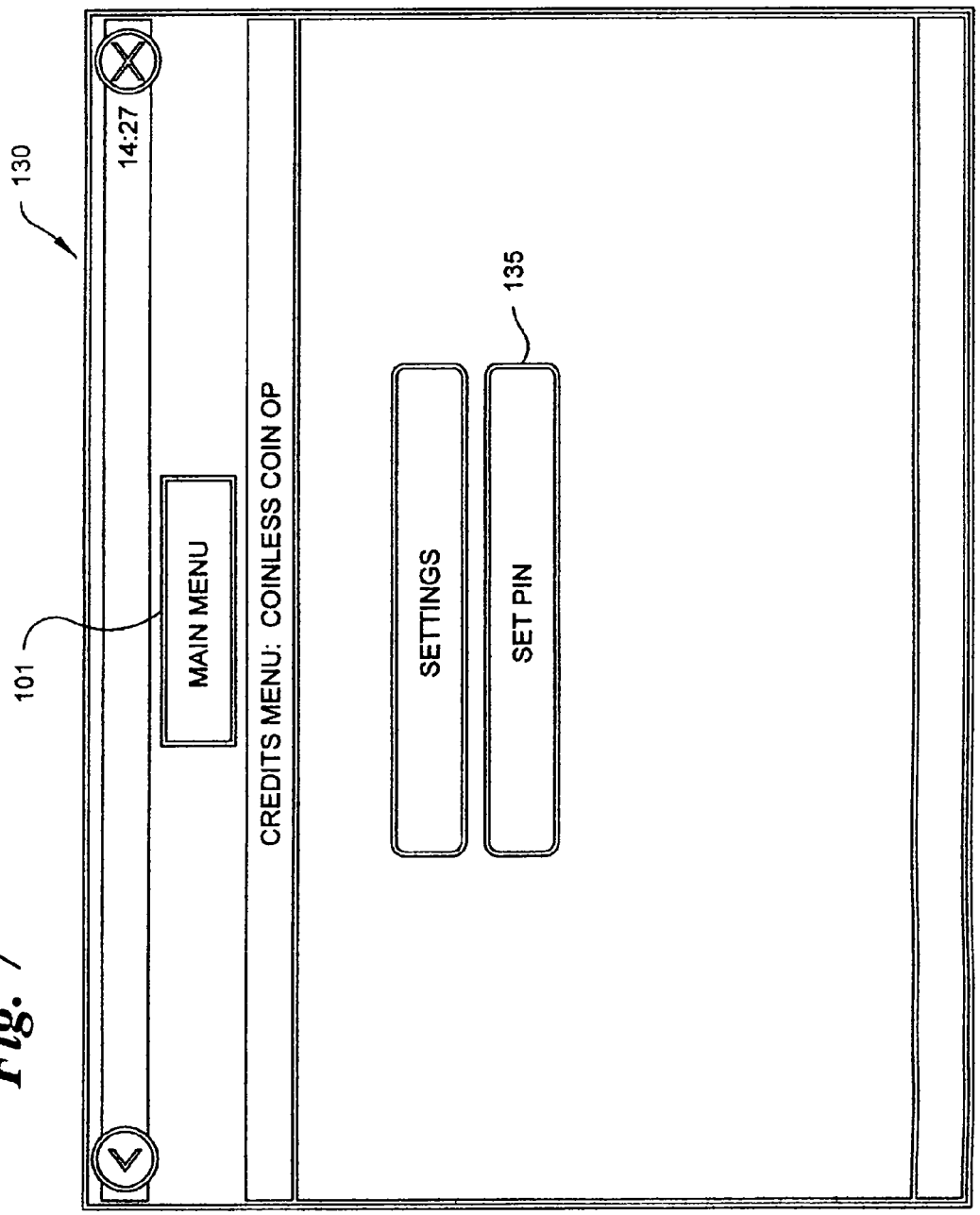
FIG. 7 is a screen shot of a coinless mode setup screen in accordance with the preferred embodiments of the present invention.
Figure 8:
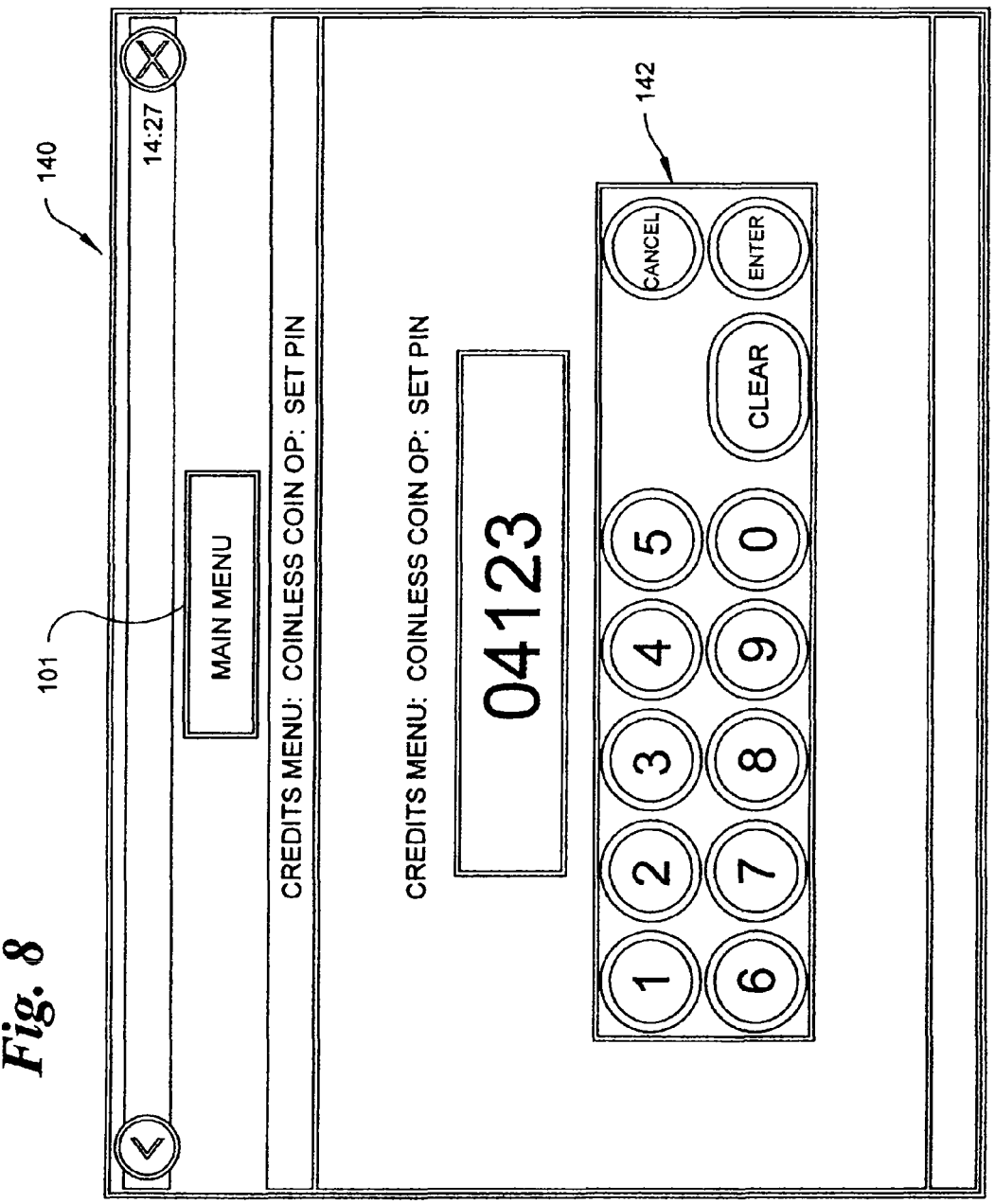
FIG. 8 is a screen shot of a set pin setup screen in accordance with the preferred embodiments of the present invention.

FIG. 7 is a screen shot of a coinless mode setup screen 130 in accordance with the preferred embodiments of the present invention. The coinless mode setup screen 130 is accessible from the coinless coin-op screens. By selecting a set pin menu selection button 135, a set pin setup screen 140 is displayed which allows the owner/operator to change an authorization pin number or password using an electronic keypad 142 (FIG. 8).

Figure 9:
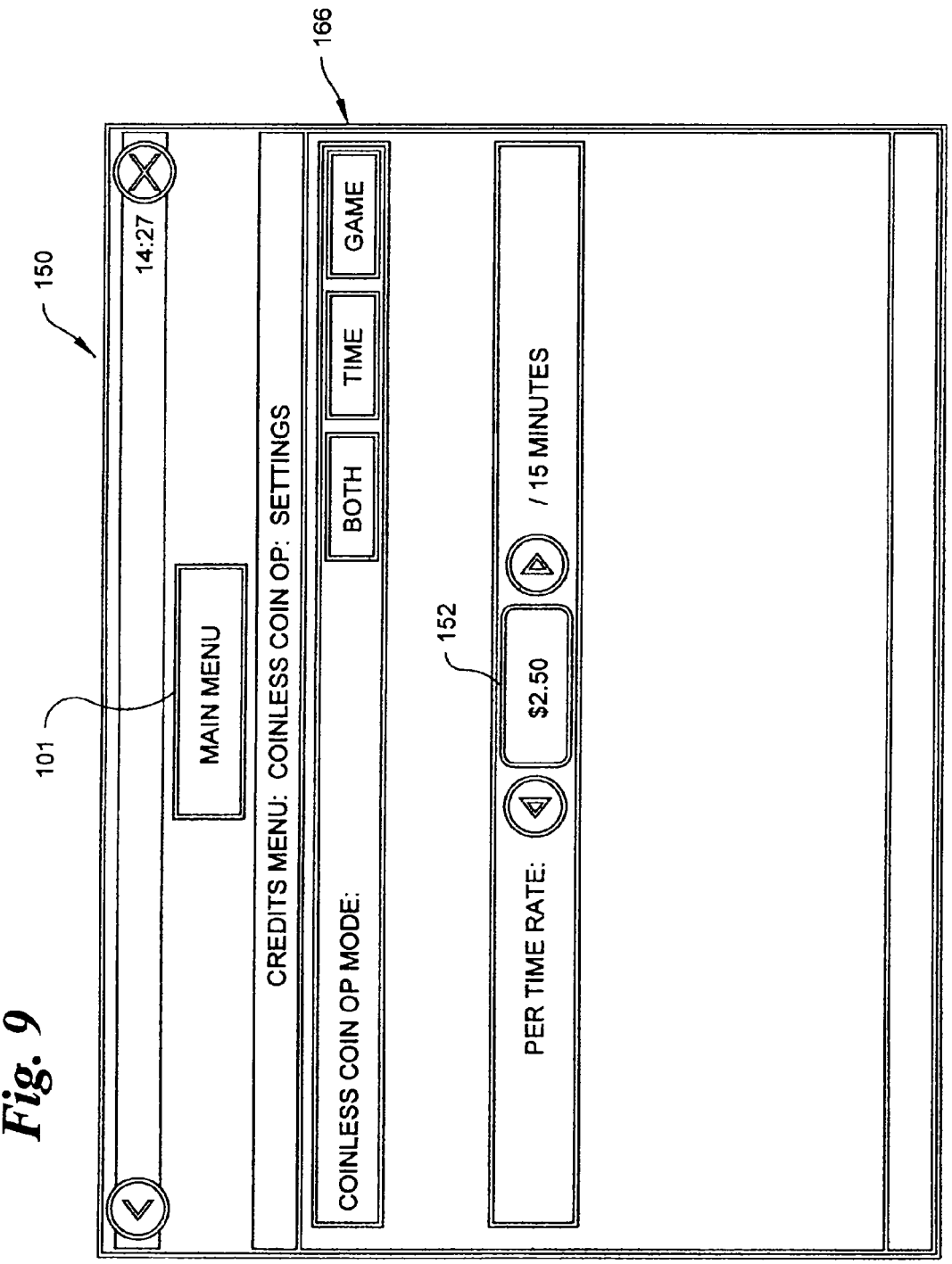
FIG. 9 is a screen shot of a payment mode setup screen in accordance with the first preferred embodiment of the present invention.

FIG. 9 is a screen shot of a payment mode setup screen in accordance with the first preferred embodiment of the present invention. The amusement device 36 includes an operator adjustable software selection field 152 that adjusts the associated cost of the block of time. While the block of time is shown in FIG. 9 as a non-adjustable field (i.e., "15 Minutes"), the amusement device 36 also includes an operator adjustable software selection field that allows adjustment of the duration of the block of time. The setup mode includes a software selection 166 for selecting between a per game mode ("GAME"), a first time based mode/a second time based mode ("TIME") or both a per game mode and a time based mode ("BOTH"). The first time based mode permits the controller U1 to grant the user the block of time in advance of a payment or a credit by the user, and the second time based mode permits the controller to grant the user the block of time only after a payment or a credit by the user. Optionally, the amusement device may be configured to only function in one time based mode without the ability to select between them and the per game mode, which may be required to comply with state gaming regulations and the like.

Figure 10:
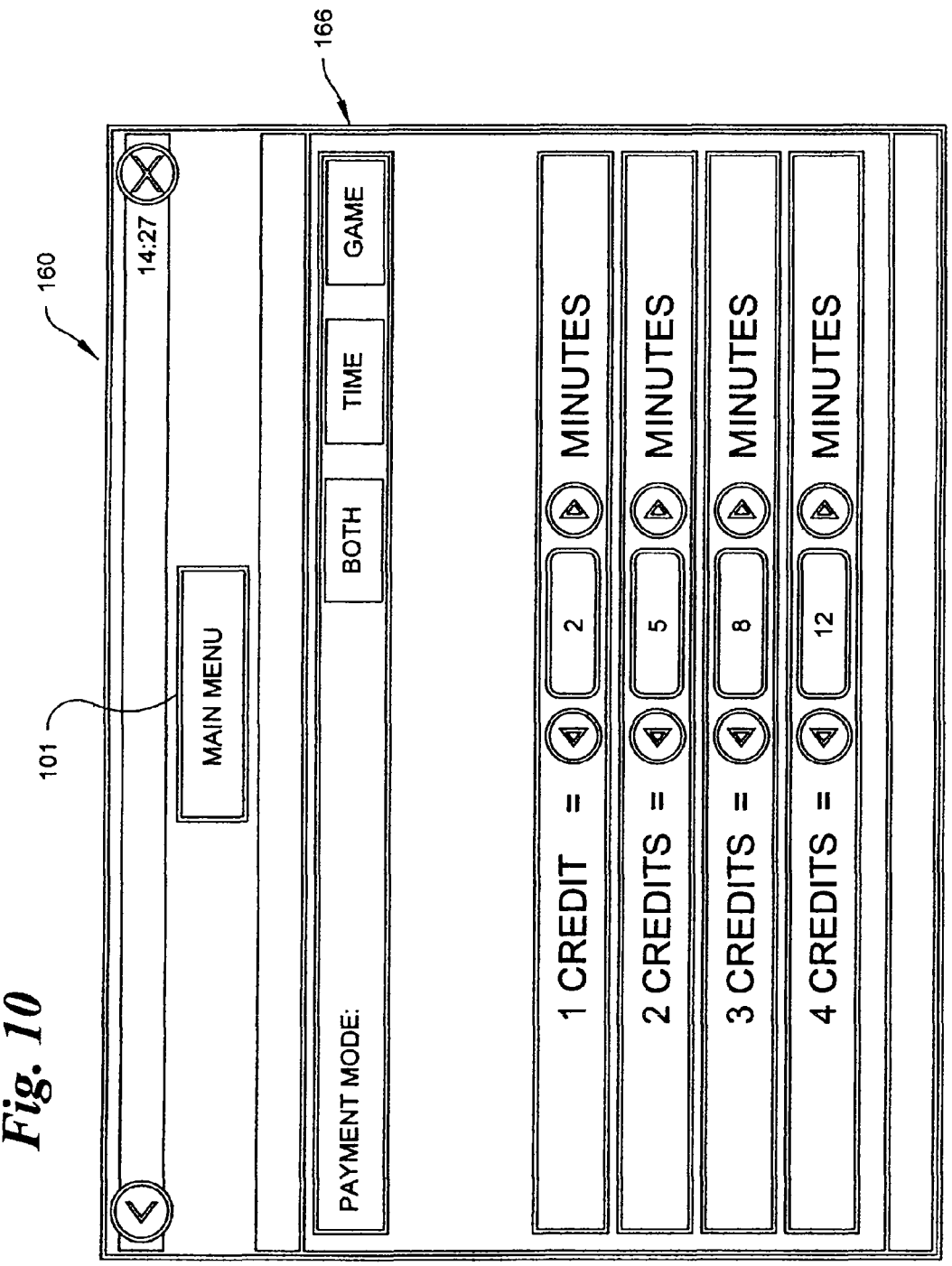
FIG. 10 is a screen shot of a payment mode setup screen in accordance with the first preferred embodiment of the present invention.
Figure 11:
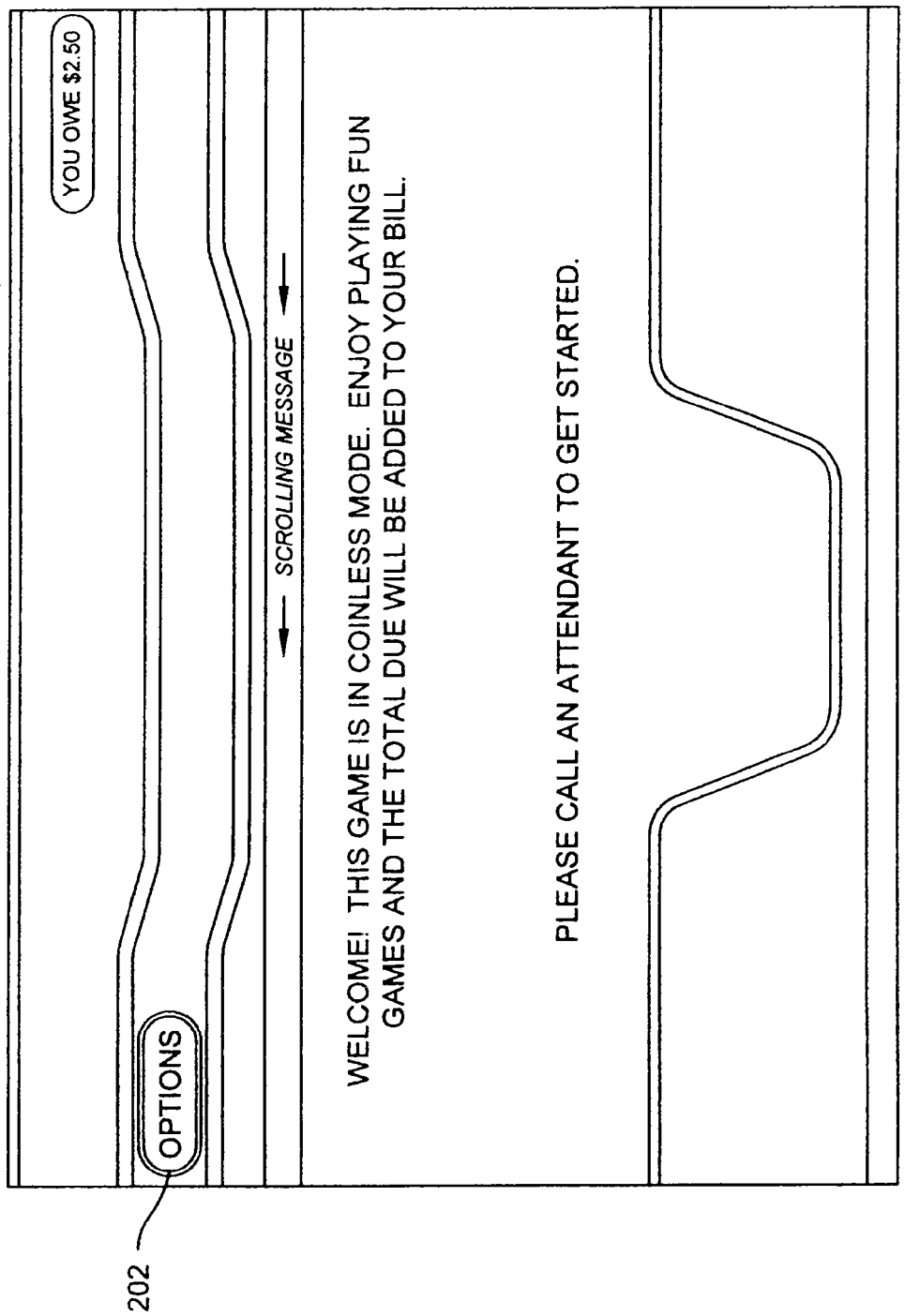
FIG. 11 is a screen shot of a user message screen in accordance with the first preferred embodiment of the present invention.

FIG. 10 is a screen shot of the payment mode setup screen 160 in accordance with the second preferred embodiment of the present invention. The owner/operator can set the number of minutes for each respective number of credits or monetary unit to thereby establish a ratio of time duration per credit or monetary value.

Once the owner/operator has finished configuring the system parameters in the setup screens 100, 110, 120, 130, 140, 150, 160, etc., the owner/operator selects the exit button "X" to return to the operating screens (FIGS. 11-19).

Figure 12:
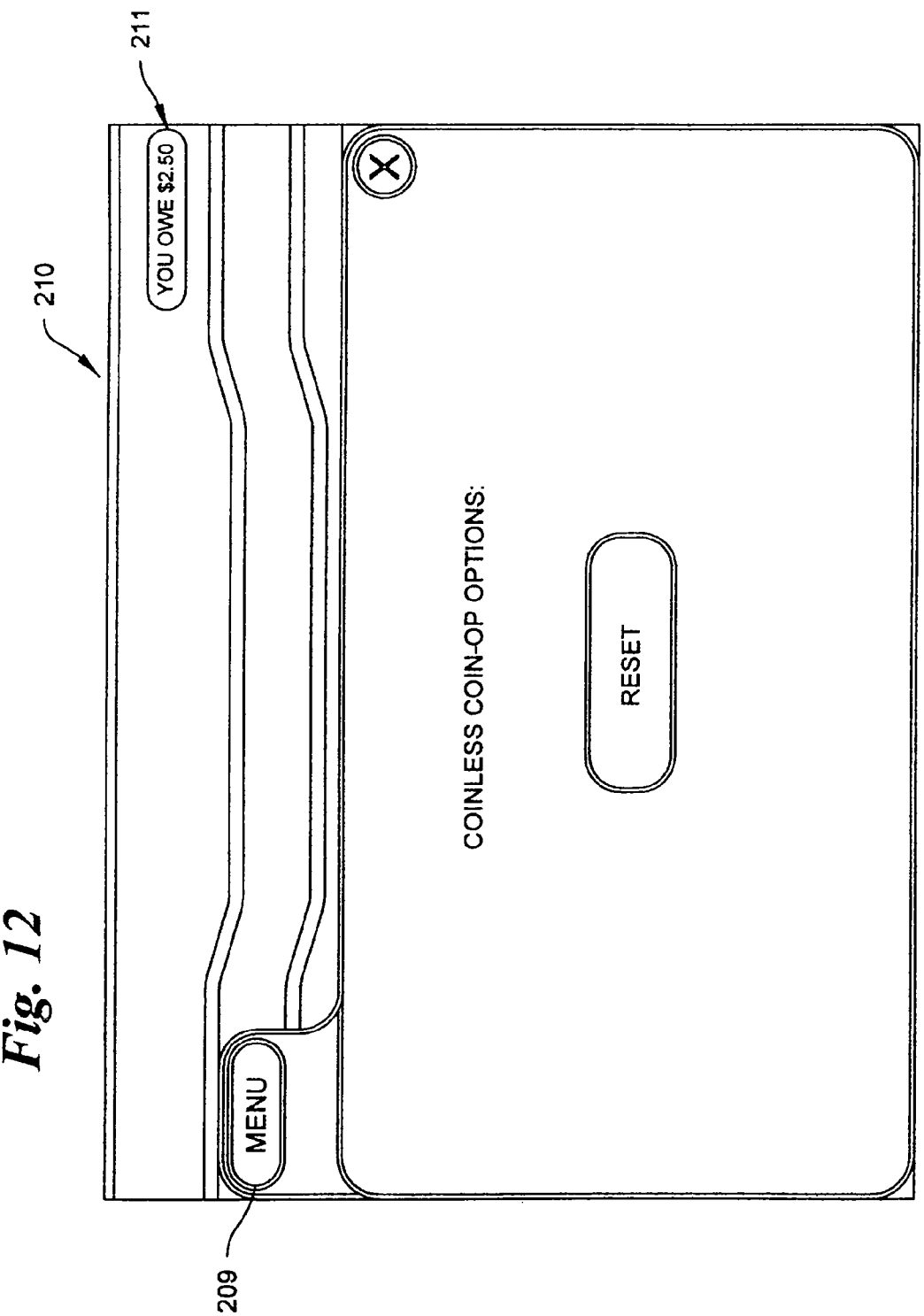
FIG. 12 is a screen shot of an attendant reset screen in accordance with the first preferred embodiment of the present invention.

During normal operation, the amusement device 36 displays an attract screen (not shown) which may show demonstrations of games or advertisements and the like. When a user desires to play the amusement device 36, the user touches the input device, or in this example, the touchscreen display 37. Upon touching the touchscreen display 37, a user message screen 200 (FIG. 11) is displayed. The user message screen 200 may instruct the user to request an attendant's assistance. Alternatively, the screen may already be authorized so that a user can begin playing without an attendant's assistance, e.g., "Please call an attendant to get started." The attendant then selects an options menu button 202 in order to display an attendant reset screen 210 (FIG. 12). The attendant can then select a "RESET" pushbutton in order to clear any previous balance that had been accrued in the amusement device from previous users. A balance indicator 211 displays the current amount owed ($2.50 in FIG. 12). The attendant is prompted to enter a pin or password in the onscreen keypad 212 (FIG. 13) in order to effectuate the reset. The balance is then reset to zero as shown in the balance indicator 21 ($0.00 in FIG. 13). The attendant then selects a menu screen selection button 209 in order to request a user options menu screen 220 (FIG. 14).

Figure 14:
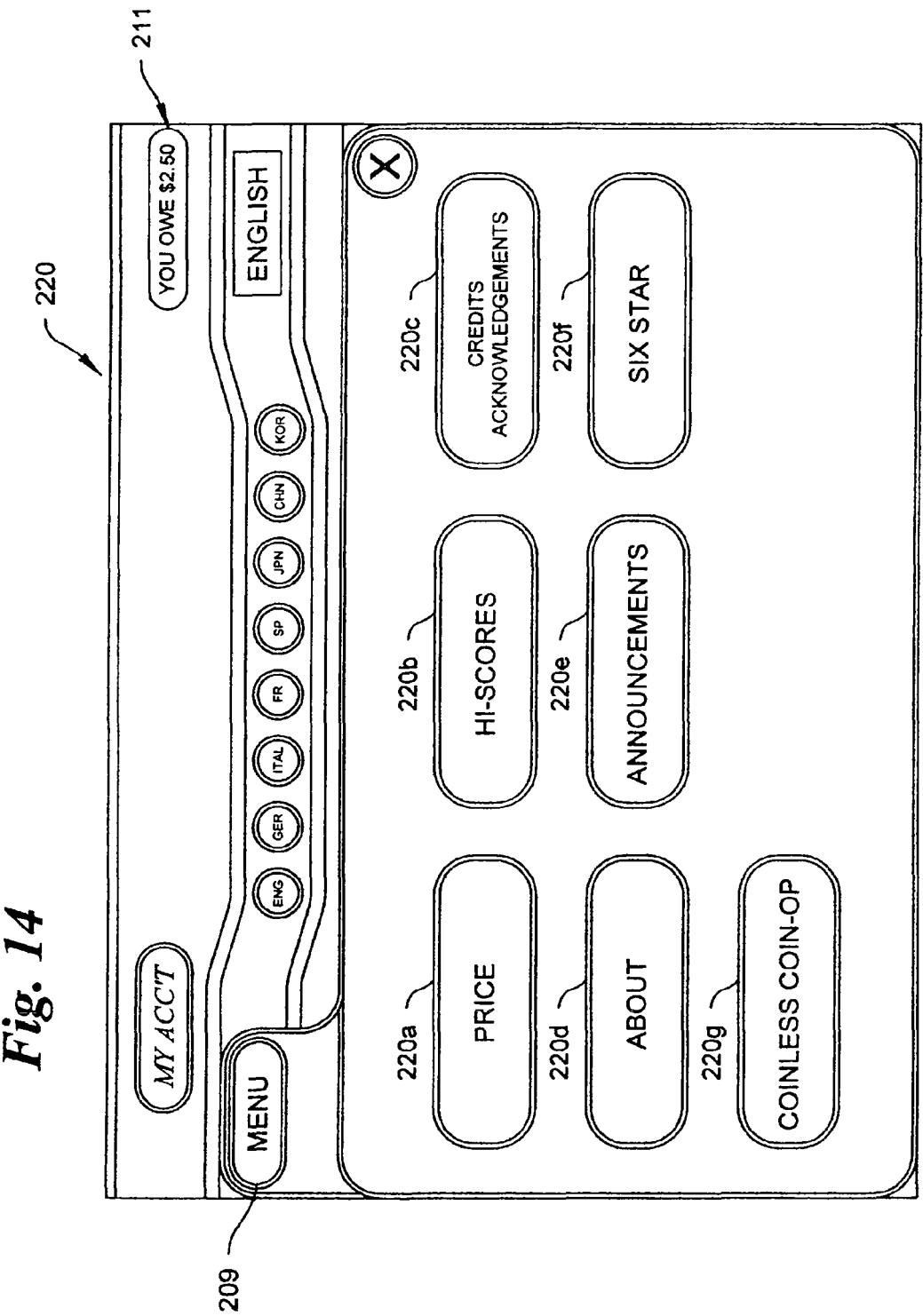
FIG. 14 is a screen shot of a user options screen in accordance with the preferred embodiments of the present invention.
Figure 15:
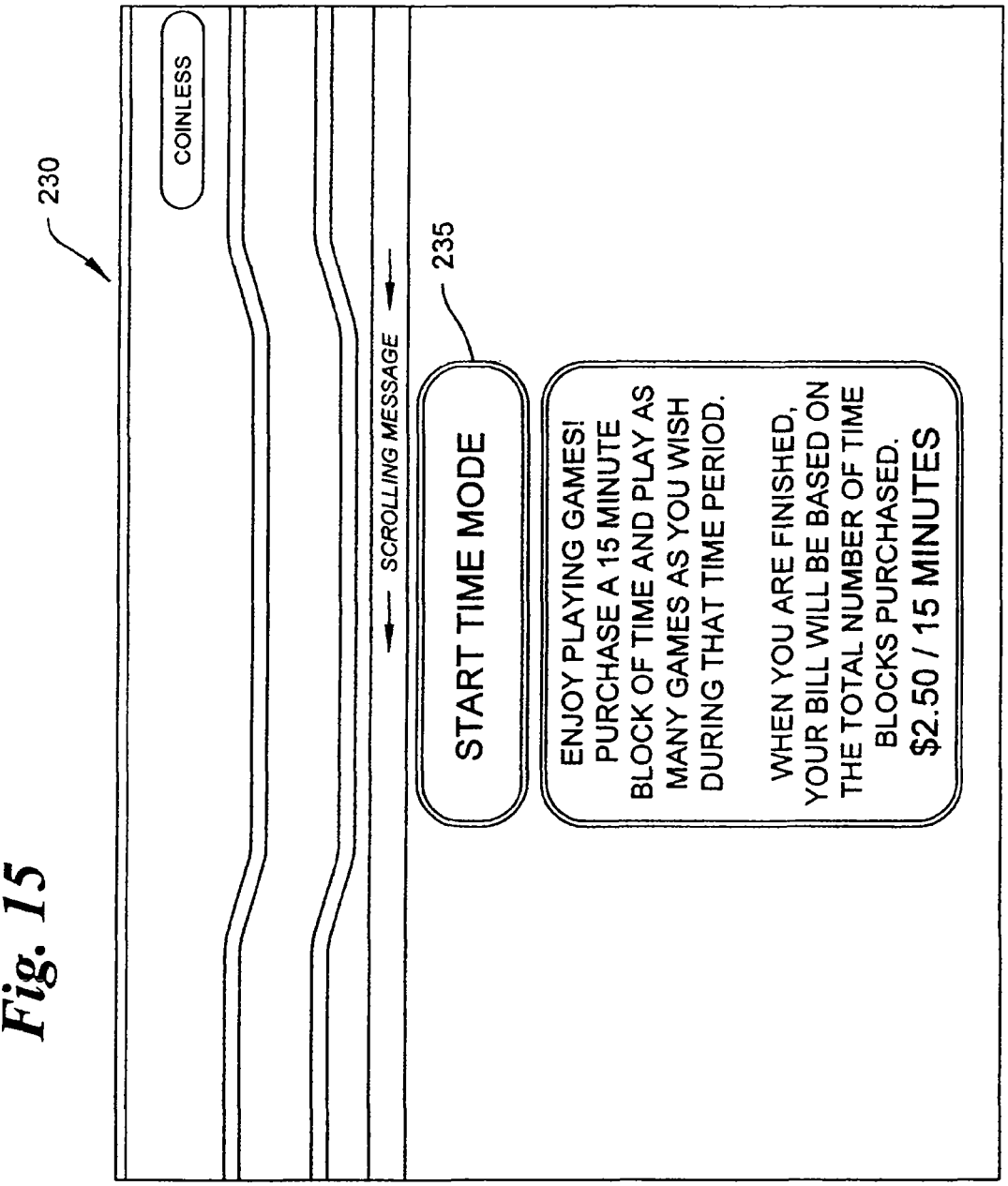
FIG. 15 is a screen shot of a user start time mode screen in accordance with the first preferred embodiment of the present invention.
Figure 16:
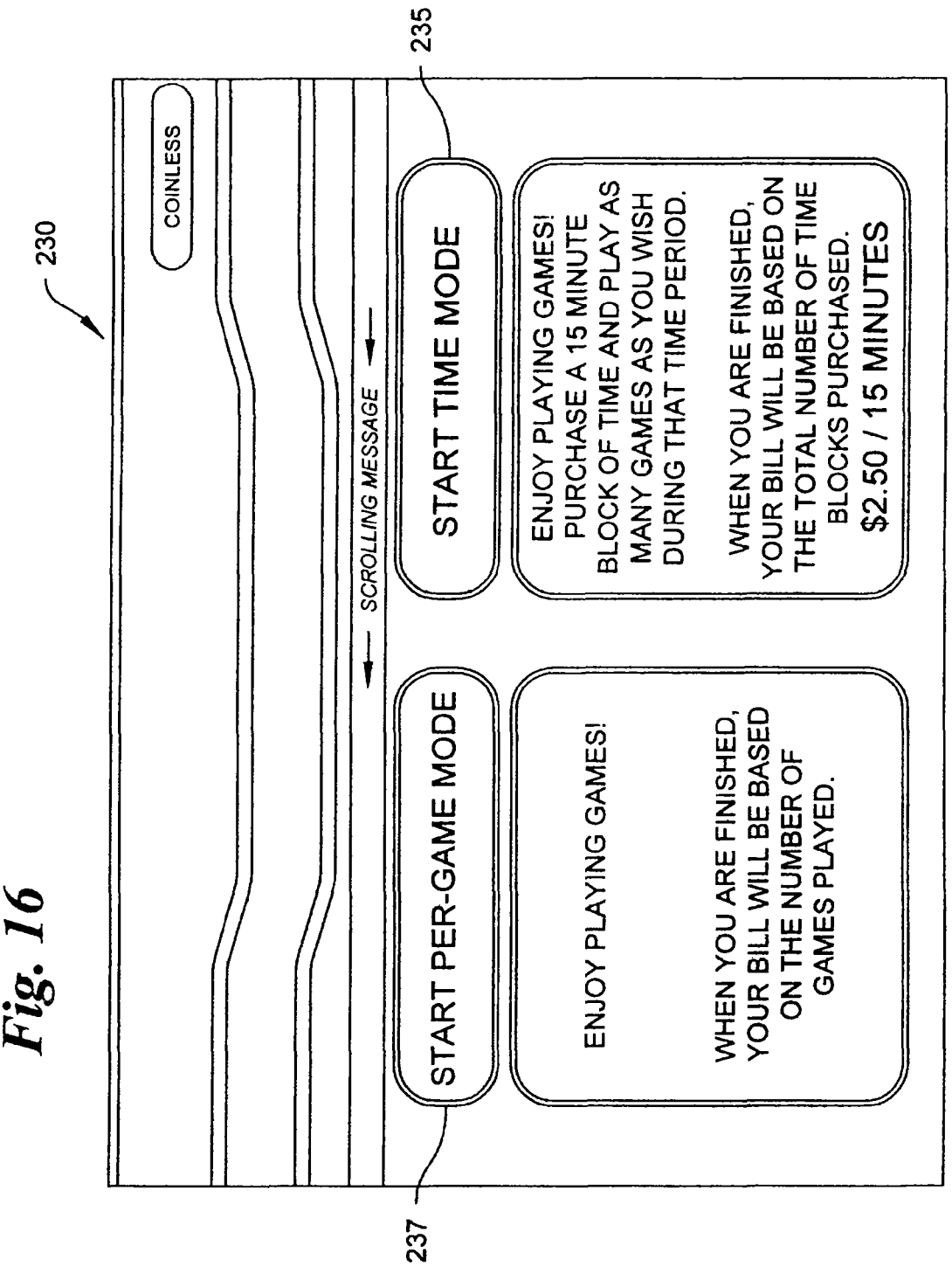
FIG. 16 is a screen shot of a user select mode screen in accordance with an alternate of the first preferred embodiment of the present invention.
Figure 17:
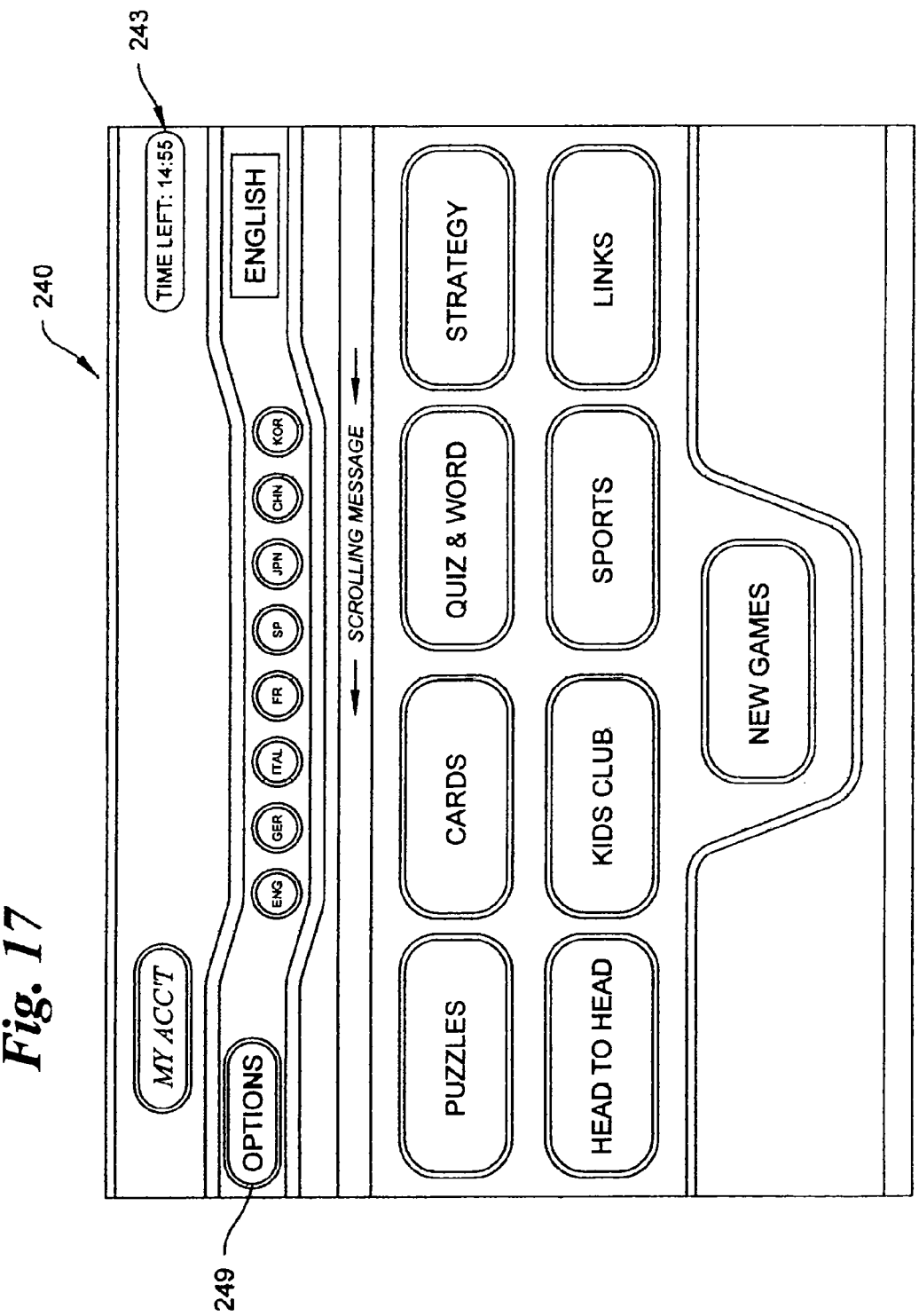
FIG. 17 is a screen shot of a user main menu screen in accordance with the preferred embodiments of the present invention showing the time remaining.
Figure 18:
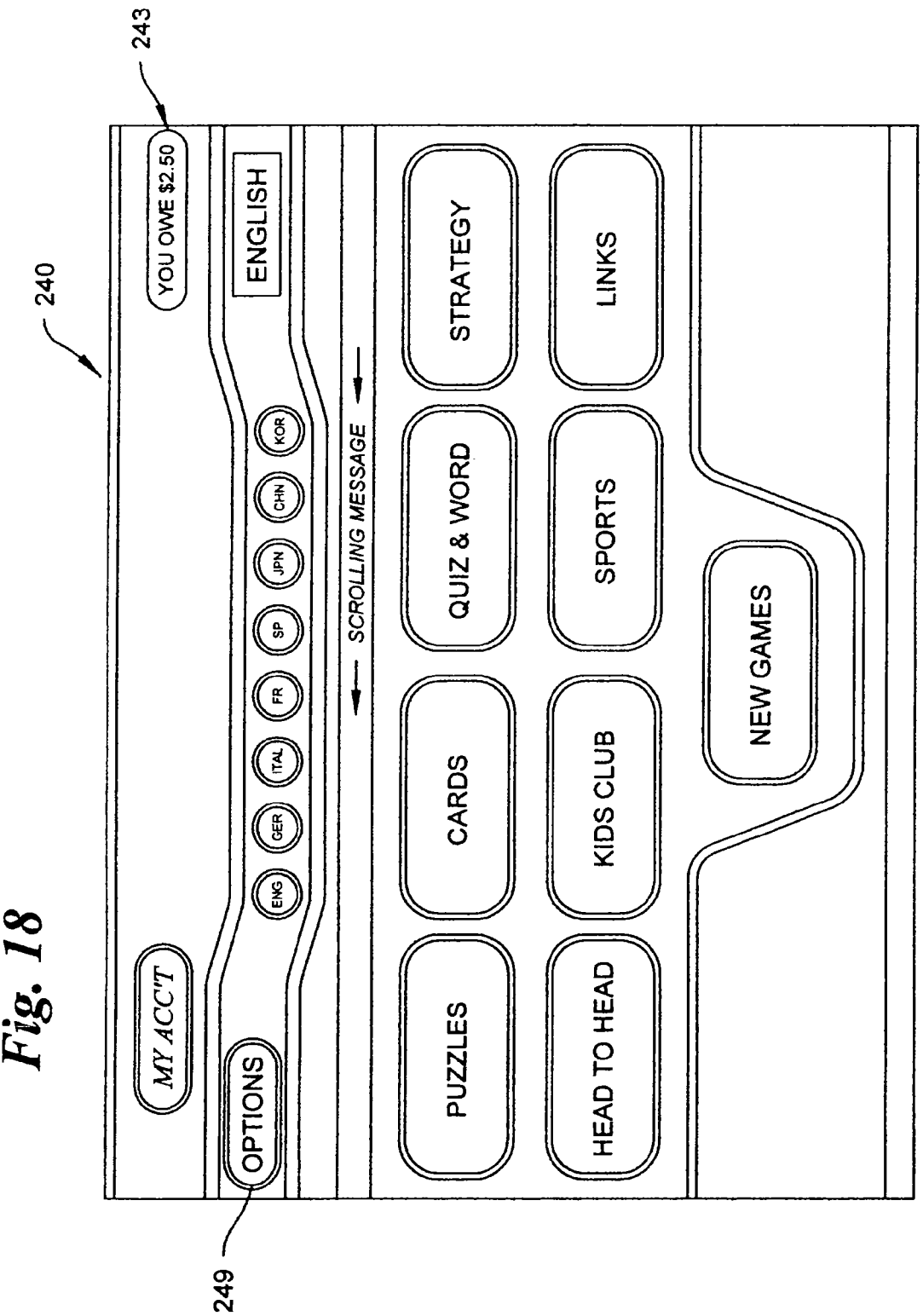
FIG. 18 is another screen shot of the user main menu screen displaying the amount owed.
Figure 19:
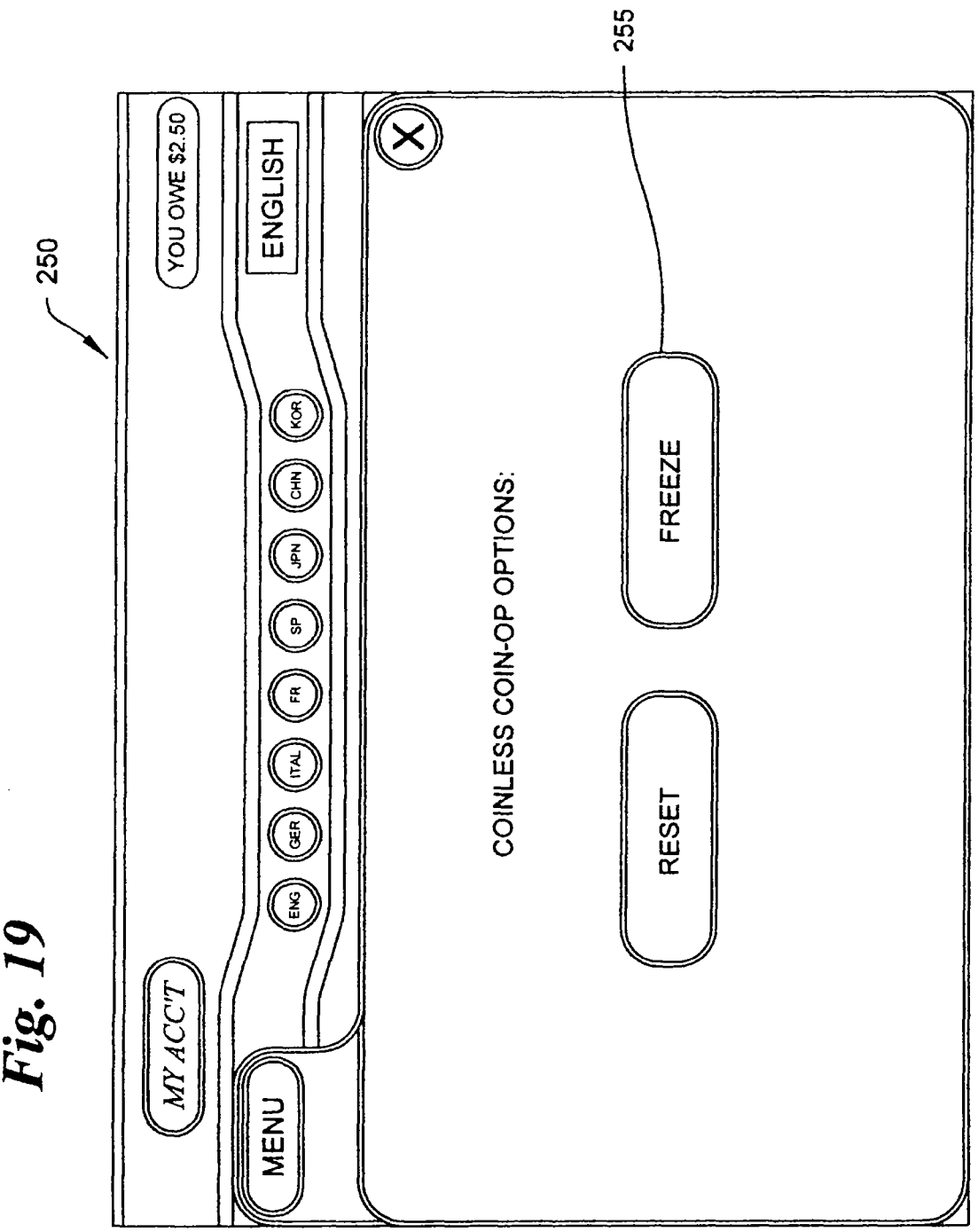
FIG. 19 is a screen shot of a user options screen for ending play in accordance with the preferred embodiments of the present invention.

FIG. 14 shows the user options screen 220. The user options screen 220 includes a plurality of menu buttons 220a-220f including a price menu button 220a, a hi-scores menu button 220b, a credit acknowledgements menu button 220c, an about menu button 220d, an announcements menu button 220e, a six star menu button 220f and a coinless coin-op menu button 220g. When a user selects the coinless coin-op menu button 220g, a coinless coin-op screen 230 is displayed (FIGS. 15-16). FIG. 15 shows that the time based mode is the only one configured, and FIG. 16 shows that both the time based mode and the per game mode are configured for access. By selecting a start time mode button 235, the user accepts the terms and is permitted to play as many games as they wish during a block of time. Alternatively, the user can select a per-game mode pushbutton 237. Once one of the selections has been made, a user main menu screen 240 (FIG. 17) is displayed which allows the user to select between a plurality of games such as puzzles, cards, quiz and word games, strategy games, head to head games (multiplayer competition), sports games and the like. A time remaining/balance indicator 243 shows the unused time remaining (i.e., "14:55" minutes in FIG. 17). FIG. 18 is another screen shot of the user main menu screen 240 where the time remaining/balance indicator 243 is displaying the amount owed (i.e., "$2.50"). FIG. 19 is a screen shot of a user options screen for ending play in accordance with the preferred embodiments of the present invention. When the user wishes to end a block of time or the per game mode, the user can select a user options button 249 which then displays a user coinless coin-op options screen 250. By selecting a freeze button 255, the amusement device 36 is essentially locked out until an attendant resets the machine. This feature protects a user who walks away from the amusement device 36 from having others access the amusement device 36 and cause additional charges to accrue.

The present invention includes method of playing the amusement device 36 as described above. The method includes granting a user a block of time for accessing the amusement device 36; selecting and playing a first game from the plurality of games during the block of time; and selecting and playing a second game from the plurality of games that is different than the first game during the block of time. The controller U1 grants the user the block of time in advance of a payment by the user or grants the user the block of time only after a payment or a credit by the user depending on how the setup mode is configured by the owner or operator of the amusement device 36. As mentioned above, the amusement device 36 includes a selector (check boxes on FIG. 6 and/or buttons on FIGS. 9-10) for selecting between a first mode, a second mode or both. The first mode permits the controller U1 to grant the user the block of time in advance of a payment by the user and the second mode permits the controller to grant the user the block of time only after a payment or a credit by the user. Optionally, the controller is configured to prompt the user to purchase another block of time just before the block of time elapses.

The present invention also includes another method of playing the amusement device 36 as described above. The method includes providing the amusement device 36 an authorization to grant a user a block of time for accessing the amusement device 36; granting the user the block of time; selecting and playing a first game from the plurality of games during the block of time; selecting and playing a second game from the plurality of games that is different than the first game during the block of time; and allowing the user to continue playing the second game until the second game ends even after the block of time has elapsed.

From the foregoing it can be seen that the present invention comprises an amusement device having time-based operating modes. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An amusement device having a display and an input device, the amusement device comprising:
   (a) a memory that stores a plurality of electronic games and a system control program, each of the plurality of electronic games being different from one another; and
   (b) a controller operatively coupled to the memory, the input device and the display, the controller controlling the display based upon the system control program retrieved from the memory and based upon inputs from the input device,
   the controller being configured to:
      (i) grant a user a block of time for accessing the amusement device;
      (ii) present at least one screen on the display while preventing the user from accessing any playable game functionality of the device until the block of time is granted;
      (iii) permit the user to selectively retrieve from the memory and play one of the plurality of electronic games during the block of time;
      (iv) permit the user to selectively retrieve from the memory and play at least one other of the plurality of electronic games during the block of time, each of the plurality of electronic games providing a score that does not affect the block of time granted;
      (v) permit the user to end the block of time using the input device and lock the amusement device until an operator resets the amusement device; and
      (vi) upon termination of the block of time by the user, determining a total amount of a payment or a credit owed for at least a portion of the block of time.

2. The amusement device of claim 1, wherein the controller must receive an authorization prior to granting the block of time.

3. The amusement device of claim 2, wherein the authorization is one of a pin code entry, card code data, a network signal, and a remote control signal.

4. The amusement device of claim 1, wherein the amusement device includes an operating mode and a setup mode,
when the operating mode is selected, a user is selectively permitted to play games, and
when the setup mode is selected, the operator is permitted to make system setup adjustments.

5. The amusement device of claim 1, wherein the display is a touchscreen video display.

6. The amusement device of claim 1, further comprising:
(c) an operator adjustable software selection field that adjusts a credit value per unit of time, which is used by the controller to determine the total amount of payment or a credit owed for the at least a portion of the block of time.

7. The amusement device of claim 1, further comprising at least one of a currency acceptor and a card reader.

8. The amusement device of claim 1, wherein the input device is one of a touchscreen, a touchpad, a trackball, a mouse, a joystick, a foot-pedal, a voice-recognition system, a keypad, and a keyboard.

9. An amusement device having a display and an input device, the amusement device comprising:
(a) a memory that stores a plurality of electronic games and a system control program, each of the plurality of electronic games being different from one another; and
(b) a controller operatively coupled to the memory, the input device and the display, the controller controlling the display based upon the system control program retrieved from the memory and based upon inputs from the input device,
the controller being configured to
(i) grant a user a block of time for accessing the amusement device after a payment or a credit is received from the user;
(ii) present at least one screen on the display while preventing the user from accessing any playable game functionality of the device until the block of time is granted;
(iii) permit the user to selectively retrieve from the memory and play one of the plurality of electronic games during the block of time;
(iv) permit the user to selectively retrieve from the memory and play at least one other of the plurality of electronic games during the block of time, each of the plurality of electronic games providing a score that does not affect the block of time granted; and
(v) permit the user to end the block of time using the input device and lock the amusement device until an operator resets the amusement device.

10. The amusement device of claim 9, wherein the controller is further configured to:
(vi) prompt the user to purchase another block of time just before the block of time elapses.

11. The amusement device of claim 9, wherein the controller is further configured to:
(vi) when the block of time expires, permit the user to continue playing the current one of the plurality of electronic games to completion without requiring the granting of an additional block of time.

12. The amusement device of claim 9, further comprising:
(c) an operator adjustable software selection field that adjusts the duration of the block of time.

13. The amusement device of claim 9, further comprising:
(c) an operator adjustable software selection field that adjusts an associated cost of the block of time.

14. The amusement device of claim 9, wherein the amusement device includes an operating mode and a setup mode,
when the operating mode is selected, a user is permitted to play games, and
when the setup mode is selected, the operator is permitted to make system setup adjustments.

15. The amusement device of claim 9, wherein the display is a touchscreen video display.

16. The amusement device of claim 9, further comprising at least one of a currency acceptor and a card reader.

17. The amusement device of claim 9, wherein the input device is one of a touchscreen, a touchpad, a trackball, a mouse, a joystick, a foot-pedal, a voice-recognition system, a keypad, and a keyboard.

* * * * *